US008330813B2

United States Patent
Kogane et al.

(10) Patent No.: US 8,330,813 B2
(45) Date of Patent: Dec. 11, 2012

(54) MONITORING CAMERA DEVICE

(75) Inventors: Haruo Kogane, Kanagawa (JP); Yasuji Nakamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1420 days.

(21) Appl. No.: 11/573,459

(22) PCT Filed: Jul. 29, 2005

(86) PCT No.: PCT/JP2005/013922
§ 371 (c)(1),
(2), (4) Date: Feb. 9, 2007

(87) PCT Pub. No.: WO2006/022112
PCT Pub. Date: Mar. 2, 2006

(65) Prior Publication Data
US 2009/0251543 A1   Oct. 8, 2009

(30) Foreign Application Priority Data
Aug. 25, 2004   (JP) .................................. 2004-244826

(51) Int. Cl.
*H04N 7/18* (2006.01)
*H04N 7/52* (2006.01)
(52) U.S. Cl. ...................... 348/143; 348/231.4; 348/552
(58) Field of Classification Search .................. 348/143, 348/14.03, 14.05
See application file for complete search history.

(56) References Cited

U.S. PATENT DOCUMENTS

| 5,170,427 A * | 12/1992 | Guichard et al. .......... 348/14.05 |
| 6,128,396 A * | 10/2000 | Hasegawa et al. ............ 382/103 |
| 2004/0143602 A1 | 7/2004 | Ruiz et al. |
| 2004/0268380 A1 * | 12/2004 | Divakaran et al. ............... 725/19 |

FOREIGN PATENT DOCUMENTS

| JP | 2002-300569 | 10/2002 |
| JP | 2003-174516 A | 6/2003 |
| JP | 2003-189139 A | 7/2003 |
| JP | 2003-198716 A | 7/2003 |

OTHER PUBLICATIONS

Supplementary European Search Report for Appl. No. PCT/JP2005/013922 dated Sep. 30, 2010.

* cited by examiner

*Primary Examiner* — David Czekaj
*Assistant Examiner* — David N Werner
(74) *Attorney, Agent, or Firm* — Pearne & Gordon LLP

(57) ABSTRACT

In a camera 12, a sound input unit inputs a monitoring sound obtained from a monitoring place, and an image generation unit generates a monitoring image obtained from the monitoring place. A sound anomaly detection unit then detects a sound anomaly in the monitoring place based on the monitoring sound, and an image anomaly detection unit detects an image anomaly in the monitoring place based on the monitoring image. A comprehensive anomaly judgment unit comprehensively judges whether or not there is an anomaly based on detection results of the sound anomaly detection unit and the image anomaly detection unit. When the comprehensive anomaly judgment unit judges that there is an anomaly, an anomaly notification unit notifies a controller 14 of the anomaly. An anomaly can be reliably detected by the comprehensive anomaly judgment.

3 Claims, 11 Drawing Sheets

MONITORING CAMERA DEVICE

TECHNICAL FIELD

The present invention relates to a monitoring camera device provided with an anomaly detection function.

BACKGROUND ART

Conventionally, a monitoring camera device (surveillance camera device) provides a monitoring image taken at a monitoring place, and also has a function to detect an anomaly in a monitoring place.

An anomaly detection technique is known in which an anomaly is detected in a monitoring camera image. For example, an anomaly is detected when a large motion is seen in an image. An anomaly is also detected using a sensor. For example, a door open/close sensor, an infrared sensor, a temperature sensor, and the like are used. In addition, anomaly detection using a sound is known, too. For example, an anomaly is detected when an input sound from a microphone is equal to or greater than a prescribed judgment level. An anomaly detection technique is disclosed, for example, in Japanese Published Patent Application No. 2002-300569 (page 11 and FIG. 2).

However, conventional monitoring camera devices separately treat an anomaly in an image, an anomaly detected by a sensor, and an anomaly in a sound, and therefore may destroy the certainty of anomaly detection.

DISCLOSURE OF THE INVENTION

Problems to be Solved by the Invention

A purpose of the invention made in the above-mentioned background is to provide an improved monitoring camera device and an improved method of using a monitoring camera device. A purpose of the invention is to provide a monitoring camera device and method that can detect an anomaly more reliably. A purpose of the invention is to provide a monitoring camera device and method that can set a camera suitably.

Means for Solving the Problems

A monitoring camera device of an aspect of the invention comprises: a sound input unit for inputting a monitoring sound obtained from a monitoring place; an image generation unit for generating a monitoring image obtained from the monitoring place; a sound anomaly detection unit for detecting a sound anomaly in the monitoring place based on the monitoring sound; an image anomaly detection unit for detecting an image anomaly in the monitoring place based on the monitoring image; a comprehensive anomaly judgment unit for comprehensively judging whether or not there is an anomaly based on detection results of the sound anomaly detection unit and the image anomaly detection unit; and an anomaly notification unit for notifying about an anomaly when it is judged that there is an anomaly by the comprehensive anomaly judgment unit.

A monitoring camera device of an aspect of the invention comprises: a camera; a monitor connected to the camera; and an operation unit, where the camera is provided with: a sound input unit for inputting a monitoring sound obtained from a monitoring place; a sound anomaly detection unit for detecting a sound anomaly in the monitoring place based on the monitoring sound; and a statistical information generation unit for generating statistical information on an input state of the sound input unit, where the monitor displays the statistical information, and where the operation unit accepts an operation for setting a sound anomaly judgment level for the sound anomaly detection unit.

A monitoring camera device of an aspect of the invention comprises: a camera; a monitor connected to the camera; and an operation unit, where the camera is provided with: a sound input unit for inputting a monitoring sound obtained from a monitoring place; and a statistical information generation unit for generating statistical information on an input state of the sound input unit, where the monitor displays the statistical information, and where the operation unit accepts an operation for setting an input level for the sound input unit.

A monitoring camera device of an aspect of the invention comprises: a camera; a monitor connected to the camera; and an operation unit, where the camera is provided with: a sound output unit for outputting a sound to a monitoring place; and a statistical information generation unit for generating statistical information on an output state of the sound output unit, where the monitor displays the statistical information, and where the operation unit accepts an operation for setting an output level for the sound output unit.

An aspect of the invention is a method of detecting an anomaly in a monitoring place by a monitoring camera device, and the method comprises: inputting a monitoring sound of the monitoring place to the camera device; generating a monitoring image of the monitoring place by the camera device; detecting a sound anomaly in the monitoring place based on the monitoring sound; detecting an image anomaly in the monitoring place based on the monitoring image; performing comprehensive anomaly judgment for comprehensively judging whether or not there is an anomaly based on detection results of the sound anomaly and the image anomaly; and notifying about an anomaly when it is judged that there is an anomaly by the comprehensive anomaly judgment. The method may further comprise: detecting an occurrence of an anomaly by a sensor, where the comprehensive anomaly judgment step may comprehensively judge whether or not there is an anomaly based on a detection result of the sensor in addition to detection results of the sound anomaly and the image anomaly.

An aspect of the invention is a method of setting a sound anomaly judgment level for sound anomaly detection by a camera, the method being performed on a monitoring camera device, the monitoring camera device comprising: a camera for taking a picture of a monitoring place; a monitor connected to the camera; and an operation unit, the camera being provided with a function to input a monitoring sound of the monitoring place and to detect a sound anomaly in the monitoring sound, and the method comprises: inputting the monitoring sound of the monitoring place to the camera; generating statistical information on an input state of a sound; displaying the statistical information on the monitor; accepting by the operation unit an operation of setting a sound anomaly judgment level for sound anomaly detection, after the statistical information is displayed; and setting a sound anomaly judgment level in accordance with an accepted operation.

An aspect of the invention is a method of setting a sound input level for a camera, the method being performed on a monitoring camera device, the monitoring camera device comprising: a camera for taking a picture of a monitoring place; a monitor connected to the camera; and an operation unit, the camera being provided with a function to input a monitoring sound of the monitoring place, and the method comprises: inputting the monitoring sound of the monitoring place to the camera; generating statistical information on an input state of a sound; displaying the statistical information on the monitor; accepting by the operation unit an operation of setting a sound input level, after the statistical information is displayed; and setting a sound input level in accordance with an accepted operation.

An aspect of the invention is a method of setting a sound output level for a camera, the method being performed on a monitoring camera device, the monitoring camera device comprising: a camera for taking a picture of a monitoring place; a monitor connected to the camera; and an operation unit, the camera being provided with a function to output a sound to the monitoring place, and the method comprises: outputting a sound from the camera to the monitoring place; generating statistical information on an output state of a sound; displaying the statistical information on the monitor; accepting by the operation unit an operation for setting a sound output level, after the statistical information is displayed; and setting a sound output level in accordance with an accepted operation.

There are other aspects of the invention as described below. This disclosure of the invention therefore intends to provide part of aspects of the invention and does not intend to limit the scope of the invention described and claimed herein.

DESCRIPTION OF THE SYMBOLS

Figure 1:
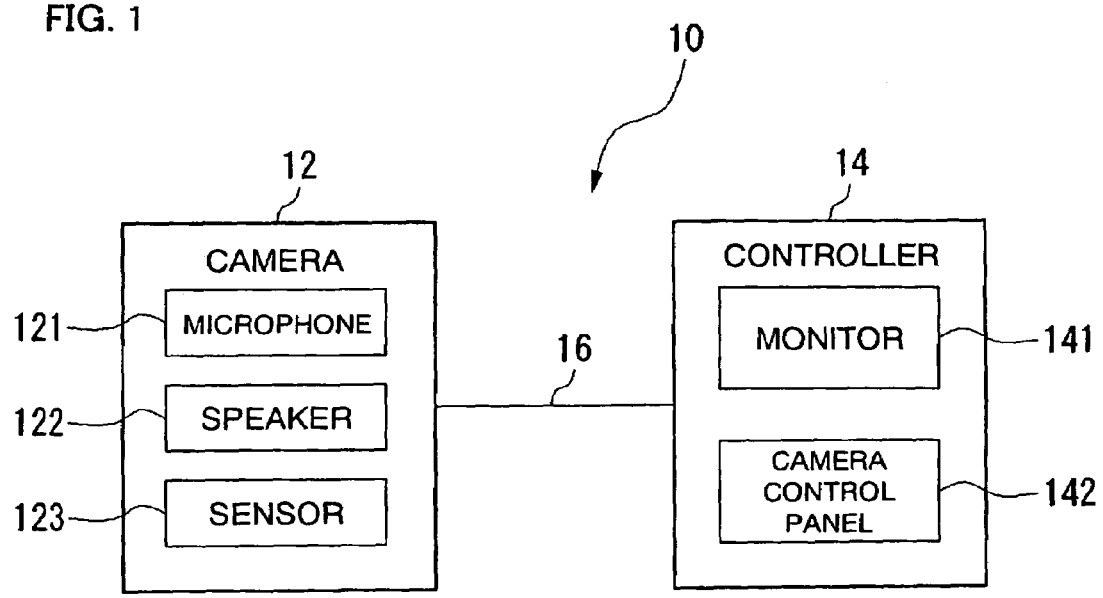
FIG. 1 is a block diagram of a monitoring camera device of an embodiment of the invention.

10: Monitoring camera device
12: Camera
14: Controller
16: Coaxial cable
20: CCD
26: Digital signal processing unit
30: Microphone
34: Amplifier
38: Digital signal processing unit
40: Speaker
42: Amplifier
44: Sensor
46: Microcomputer
50: Image generation unit
52: Sound input unit
54: Sensor
56: Image anomaly detection unit
58: Sound anomaly detection unit
60: Comprehensive anomaly judgment unit
70: Monitor
72: Operation device
80: Statistical information generation unit
82: Sound anomaly judgment level storage unit
84: Automatic setting unit
86: Sound input level setting unit
90: Sound output unit
92: Statistical information generation unit
94: Sound output level setting unit

BEST MODE OF EMBODYING THE INVENTION

Now, the invention will be described in detail. However, the following detailed description and appended drawings are not intended to limit the invention. Rather, the scope of the invention is defined by the appended claims.

A monitoring camera device of this embodiment comprises: a sound input unit for inputting a monitoring sound obtained from a monitoring place; an image generation unit for generating a monitoring image obtained from the monitoring place; a sound anomaly detection unit for detecting a sound anomaly in the monitoring place based on the monitoring sound; an image anomaly detection unit for detecting an image anomaly in the monitoring place based on the monitoring image; a comprehensive anomaly judgment unit for comprehensively judging whether or not there is an anomaly based on detection results of the sound anomaly detection unit and the image anomaly detection unit; and an anomaly notification unit for notifying about an anomaly when it is judged that there is an anomaly by the comprehensive anomaly judgment unit. The "sound anomaly" means an anomaly to be detected in a sound when the sound corresponding to an anomalous event occurs. The "image anomaly" means an anomaly to be detected in an image when the image corresponding to an anomalous event is taken.

In this configuration, the comprehensive anomaly judgment unit is provided which performs a process of comprehensively judging whether or not there is an anomaly based on a sound anomaly and an image anomaly, and therefore an anomaly can be reliably detected.

The monitoring camera device may comprise a criterion choice unit for choosing a criterion by which it is judged that there is an anomaly when both of the sound anomaly and the image anomaly are detected, or a criterion by which it is judged that there is an anomaly when any of the sound anomaly and the image anomaly is detected.

This configuration can appropriately change, depending on the situation, between the criterion by which it is judged that there is an anomaly when both of the sound anomaly and the image anomaly are detected, and the criterion by which it is judged that there is an anomaly when any of the sound anomaly and the image anomaly is detected.

The monitoring camera device may comprise a sensor for detecting an occurrence of an anomaly, where the comprehensive anomaly judgment unit may comprehensively judge whether or not there is an anomaly based on a detection result of the sensor in addition to detection results of the sound anomaly detection unit and the image anomaly detection unit.

In this configuration, a process of comprehensively judging whether or not there is an anomaly is performed based on a sensor anomaly detected by the sensor in addition to a sound anomaly and an image anomaly, and therefore an anomaly can be reliably detected.

The monitoring camera device may comprise a criterion choice unit for choosing a criterion so as to determine which of the sound anomaly, the image anomaly, or a sensor anomaly to be detected by the sensor is to be detected to judge that there is an anomaly. The "sensor anomaly" means an anomaly to be detected by the sensor.

This configuration can change, as required, which of the sound anomaly, the image anomaly, or the sensor anomaly is to be detected to judge that there is an anomaly.

The monitoring camera device may comprise: a schedule setting unit for setting a suppression period for an anomaly detection function; and a suppression unit for suppressing the anomaly detection function in accordance with a schedule set by the schedule setting unit.

In this configuration, anomaly detection can be avoided when anomaly detection is not required. In order to suppress the anomaly detection function, anomaly detection may be suppressed, the above-mentioned comprehensive judgment function may be suppressed, or the anomaly notification function may be suppressed.

The monitoring camera device may comprise: a camera provided with the sound input unit and the sound anomaly detection unit; a statistical information generation unit for generating statistical information on an input state of the sound input unit; a monitor for displaying a monitoring image from the camera and the statistical information, the monitor being connected to the camera; and an operation unit for accepting an operation of setting a sound anomaly judgment level for the sound anomaly detection unit.

In this configuration, even when it takes time to transmit a sound, or even if a sound is not transmitted, the operation of setting the sound anomaly judgment level can be performed by viewing the statistical information. For example, the sound anomaly judgment level can be set even when a sound cannot be transmitted from a legal or other point of view. Additionally, the display of the statistical information can provide useful information for appropriately setting the sound anomaly judgment level. The statistical information is, for example, a highest volume, a lowest volume, a moving average, a frequency distribution, and the like.

The monitoring camera device may comprise: an automatic setting unit for automatically setting the sound anomaly judgment level based on the statistical information; and a sound anomaly judgment level setting mode choice unit for choosing a mode in which the automatic setting unit is made to set the sound anomaly judgment level, or a mode in which the sound anomaly judgment level is set in accordance with an operation accepted by the operation unit.

In this configuration, the sound anomaly judgment level can be set automatically. In addition, the setting of the sound anomaly judgment level can be changed between the automatic setting and the manual setting based on displayed statistical information.

From another point of view, a monitoring camera device comprises: a camera; a monitor connected to the camera; and an operation unit, where the camera is provided with: a sound input unit for inputting a monitoring sound obtained from a monitoring place; a sound anomaly detection unit for detecting a sound anomaly in the monitoring place based on the monitoring sound; and a statistical information generation unit for generating statistical information on an input state of the sound input unit, where the monitor displays the statistical information, and where the operation unit accepts an operation for setting a sound anomaly judgment level for the sound anomaly detection unit.

In this configuration, even when it takes time to transmit a sound, or even if a sound is not transmitted, the operation of setting the sound anomaly judgment level can be performed by viewing the statistical information. For example, the sound anomaly judgment level can be set even when a sound cannot be transmitted from a legal or other point of view. Additionally, the display of the statistical information can provide useful information for appropriately setting the sound anomaly judgment level. The statistical information is, for example, a highest volume, a lowest volume, a moving average, a frequency distribution, and the like.

The above-mentioned monitoring camera device may comprise: an automatic setting unit for automatically adjusting the sound anomaly judgment level based on the statistical information; and a sound anomaly judgment level setting mode choice unit for choosing a mode in which the automatic setting unit is made to set the sound anomaly judgment level, or a mode in which the sound anomaly judgment level is set in accordance with an operation accepted by the operation unit.

In this configuration, the sound anomaly judgment level can be set automatically. In addition, the setting of the sound anomaly judgment level can be changed between the automatic setting and the manual setting based on displayed statistical information.

From another point of view, a monitoring camera device comprises: a camera; a monitor connected to the camera; and an operation unit, where the camera is provided with: a sound input unit for inputting a monitoring sound obtained from a monitoring place; and a statistical information generation unit for generating statistical information on an input state of the sound input unit, where the monitor displays the statistical information, and where the operation unit accepts an operation for setting an input level for the sound input unit.

In this configuration, even when it takes time to transmit a sound, or even if a sound is not transmitted, the operation of setting the sound input level can be performed by viewing the statistical information. For example, the sound input level can be set even when a sound cannot be transmitted from a legal or other point of view. Additionally, the display of the statistical information can provide useful information for appropriately setting the sound input level. The statistical information is, for example, a highest volume, a lowest volume, a moving average, a frequency distribution, and the like.

From another point of view, a monitoring camera device comprises: a camera; a monitor connected to the camera; and an operation unit, where the camera is provided with: a sound output unit for outputting a sound to a monitoring place; and a statistical information generation unit for generating statistical information on an output state of the sound output unit, where the monitor displays the statistical information, and where the operation unit accepts an operation for setting an output level for the sound output unit.

In this configuration, even when it takes time to transmit a sound, or even if a sound is not transmitted, the operation of setting the sound output level can be performed by viewing the statistical information. Additionally, the display of the statistical information can provide useful information for appropriately setting the sound output level. The statistical information is, for example, a highest volume, a lowest volume, a moving average, a frequency distribution, and the like.

Now, the monitoring camera device according to the embodiment of the invention will be described with reference to the drawings.

FIG. 1 shows the monitoring camera device according to the embodiment of the invention.

In FIG. 1, a monitoring camera device 10 comprises a camera 12 and a controller 14, both of which are connected to each other by a coaxial cable 16. The camera 12 is provided with a microphone 121, a speaker 122, and an external sensor 123. On the other hand, the controller 14 is provided with a monitor 141 as an output device, and a camera control panel 142 as an input operation device. Through the coaxial cable 16 are transmitted an image, a sound, data for notifying a detected anomaly, and camera control data.

Hereinafter, an image taken by the camera 12 is called a monitoring image, as appropriate. A sound inputted from the microphone 121 of the camera 12 is called a monitoring sound, as appropriate. A monitoring image and a monitoring sound respectively mean an image and a sound which are obtained from a monitoring place.

The sound-related configuration of the monitoring camera device 10 will be further described. The monitoring camera device 10 is configured such that a sound on the camera side is transferred to the controller side and also that a sound on the controller side can be transferred to the camera side. For that purpose, the camera side is provide with a "camera-side sound collecting microphone," a "camera-side loudspeaker," a "demodulation circuit for the camera-side loudspeaker," a "modulation circuit for a sound from the camera-side sound collecting microphone," and a "camera-side sound signal separation synthesis demodulation circuit." The "coaxial cable" and a "control transmission communication path" are provided between the camera and the controller. The controller side is provided with a "control apparatus," a "television monitor," and a "control apparatus operation panel," and also with a "control-apparatus-side loudspeaker," a "control-apparatus-side sound collecting microphone," a "modulation circuit for a sound from the control-apparatus-side sound collecting microphone," a "demodulation circuit for the control-apparatus-side loudspeaker," and a "control-apparatus-side sound signal separation synthesis demodulation circuit."

Figure 2:
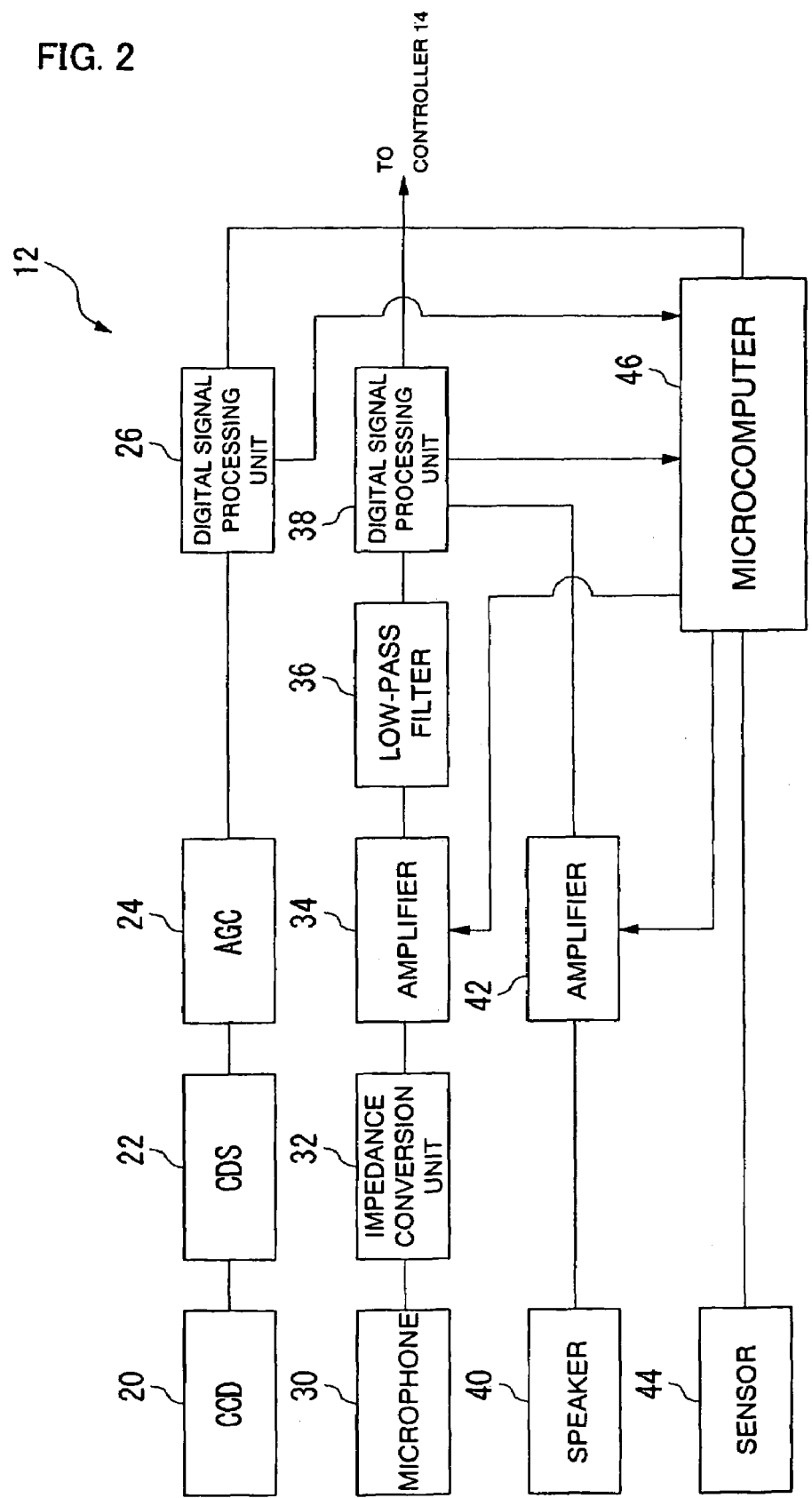
FIG. 2 is a block diagram of a camera of the embodiment of the invention.

FIG. 2 shows a configuration of the camera 12. In relation to image generation and processing, the camera 12 is provided with a CCD 20, a CDS 22, an AGC 24, and a digital signal processing unit (DSP) 26. The CDS 22, the AGC 24, and the digital signal processing unit 26 operate in accordance with a signal generated by a timing generator. An image signal is generated by the CCD 20, processed by the CDS 22, the AGC 24, and the digital signal processing unit 26, and transmitted to the controller.

In relation to sound input, the camera 12 is also provided with a microphone 30, an impedance conversion unit 32, an amplifier 34, a low-pass filter 36, and a digital signal processing unit 38. A sound is inputted from the microphone 30, processed by the impedance conversion unit 32, the amplifier 34, the low-pass filter 36, and the digital signal processing unit 38, and transmitted to the controller together with an image.

In relation to sound output, the camera 12 is also provided with a speaker 40 and an amplifier 42. A sound is transmitted from the controller through the digital signal processing unit 38 to the amplifier 42, amplified by the amplifier 42, and then outputted from the speaker 40.

A sensor 44 is connected to an external auxiliary terminal of the camera 12. The sensor 44 is a sensor for detecting an anomaly in a monitoring place. The sensor 44 is, for example, a door open/close sensor, an infrared sensor, a temperature sensor, or a fire alarm sensor.

The camera 12 is further provided with a microcomputer 46. The microcomputer 46 controls the whole of the camera 12. The microcomputer 46 communicates control data with the controller. The microcomputer 46 controls the camera 12 in accordance with control data sent from the controller.

The microcomputer 46 is connected with the image-system digital signal processing unit 26 and the sound-system digital signal processing unit 38, from which signals are inputted to the microcomputer 46. In addition, a detection signal from the sensor 44 is inputted to the microcomputer 46. The microcomputer 46 has a function to process an inputted signal to judge whether or not there is an anomaly, and to send data notifying the anomaly out to the controller.

The microcomputer 46 has a clock function and a schedule setting function, and operates in accordance with a schedule set by the schedule setting function.

Though a description is omitted from the above description about the camera 12, the camera 12 has various kinds of A/D conversion functions and D/A conversion functions. The camera 12 converts a digital signal to an analog signal, or converts an analog signal to a digital signal, as required. In addition, an image, a sound, and control data are appropriately synthesized and separated for transmission.

Figure 3:
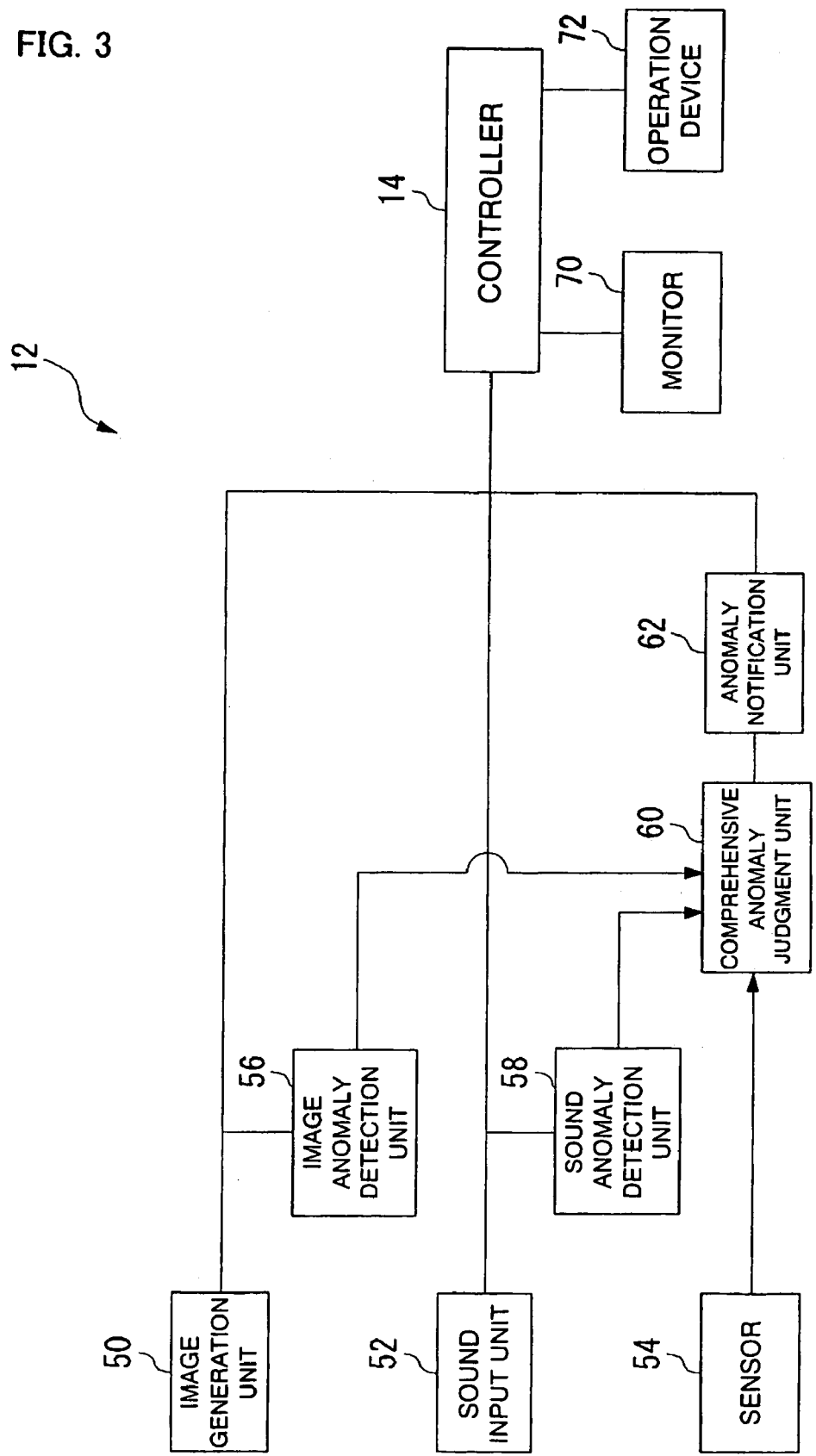
FIG. 3 is a functional block diagram showing a configuration for anomaly detection.

FIG. 3 is a functional block diagram of the monitoring camera device 10, mainly showing a configuration related to the anomaly detection function. In FIG. 3, an image generation-unit 50 comprises the CCD 20 and the like of FIG. 2, and generates a monitoring image. A sound input unit 52 comprises the microphone 30 and the like of FIG. 2, and inputs a monitoring sound. A sensor 54 corresponds to the sensor 44 of FIG. 2.

An image anomaly detection unit 56 detects an image anomaly in a monitoring place based on a monitoring image. An image anomaly means an anomaly to be detected in an image. The image anomaly detection unit 56, for example, determines a difference in motion by processing luminance or color signal components (RGB, for example) and detects an anomaly from the difference in motion. An anomaly is judged to have occurred when a difference of a prescribed threshold or more arises. In more detail, for example, when a plurality of prior and subsequent images are compared, the sum of differences in pixel values (luminance, color, or the like) between the images is determined. The sum value is compared with the prescribed threshold.

A sound anomaly detection unit 58 detects a sound anomaly in a monitoring place based on a monitoring sound. A sound anomaly means an anomaly to be detected in a sound. The sound anomaly detection unit 58 judges that an anomaly has occurred when an input sound is at a prescribed sound anomaly judgment level (threshold) or higher.

A comprehensive anomaly judgment unit 60 receives detection result information, that is, information on an image anomaly and a sound anomaly, from the image anomaly detection unit 56 and the sound anomaly detection unit 58. The comprehensive anomaly judgment unit 60 also receives a detection signal from the sensor 54 and judges whether or not a sensor anomaly has occurred. A sensor anomaly means an anomaly to be detected by the sensor.

The comprehensive anomaly judgment unit 60 performs a process of comprehensively judging whether or not there is an anomaly based on an image anomaly, a sound anomaly, and a sensor anomaly. This comprehensive judgment is a process of determining whether or not there is an anomaly by combining the three anomaly detection results. In the embodiment, the three anomaly detection results are processed in a logical operation. Logical conjunction is adopted in the embodiment. The comprehensive anomaly judgment unit 60 judges that there is an anomaly when an image anomaly, a sound anomaly, and a sensor anomaly all occur.

When the comprehensive anomaly judgment unit 60 judges that there is an anomaly, an anomaly notification unit 62 notifies the controller 14 of the anomaly. Alarm data indicating the anomaly is sent here to the controller 14. In the controller 14, an alarm is displayed on a monitor 70 and outputted from a speaker not shown in the figure.

In the above configuration, the image anomaly detection unit 56 and the sound anomaly detection unit 58 comprise the image-system digital signal processing unit 26 and the sound-system digital signal processing unit 38 of FIG. 2, respectively. The microcomputer 46 of FIG. 2 functions as the comprehensive anomaly judgment unit 60 and the anomaly notification unit 62. The digital signal processing units 26 and 38 supply image anomaly and sound anomaly signals, respectively, to the microcomputer 46, which processes the information on the image anomaly and the sound anomaly.

In this regard, the image anomaly and sound anomaly detection function may be provided on the microcomputer 46. In this case, the microcomputer 46 detects an image anomaly and a sound anomaly by software processing.

An operation of the monitoring camera device 10 of the embodiment will be described with reference to FIG. 3. Under normal conditions, that is, when there is no anomaly occurring, a monitoring image is generated by the image generation unit 50, sent to the controller 14, and displayed on the monitor 70. A monitoring sound is inputted to the sound input unit 52, sent to the controller 14, and outputted from a speaker not shown in the figure. The sensor 54 does not generate a detection signal indicating an anomaly.

Now when an anomaly occurs, the image anomaly detection unit 56 detects an image anomaly from a monitoring image. The sound anomaly detection unit 58 detects a sound anomaly from a monitoring sound. The sensor 54 generates a detection signal indicating a sensor anomaly. The information on the image anomaly, the sound anomaly, and the sensor anomaly is transmitted to the comprehensive anomaly judgment unit 60. As described above, the comprehensive anomaly judgment unit 60 comprehensively judges whether or not there is an anomaly from the information on the image anomaly, the sound anomaly, and the sensor anomaly. If there is an anomaly, the anomaly notification unit 62 notifies the controller 14 of anomaly detection information (alarm). The anomaly detection information is outputted using the monitor 70 and a speaker.

Figure 4:
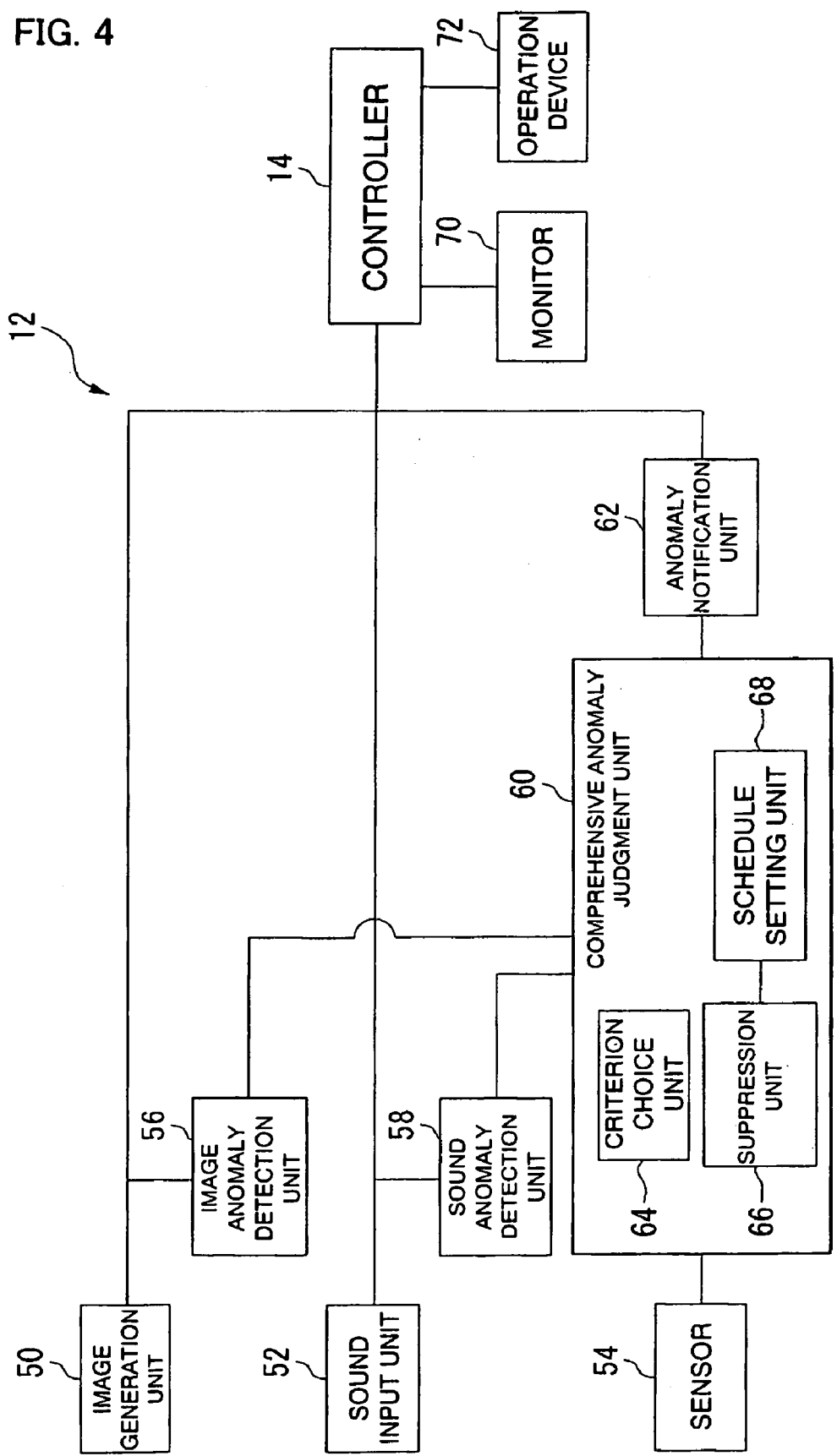
FIG. 4 shows a configuration provided with a choice function for a criterion.

FIG. 4, as a variation of FIG. 3, shows a configuration example where a choice function for a criterion and a suppression function for anomaly detection are added. In FIG. 4, the comprehensive anomaly judgment unit 60 is provided with a criterion choice unit 64 and a suppression unit 66. The criterion choice unit 64 performs a process of choosing a criterion so as to determine which of a sound anomaly, an image anomaly, or a sensor anomaly is to be detected to judge that there is an anomaly. The suppression unit 66 performs a process of suppressing anomaly detection. The suppression unit 66 refers to a schedule of a suppression period for the anomaly detection function, set by a schedule setting unit 68. The suppression unit 66 then uses a clock function not shown in the figure, and suppresses the anomaly detection function in accordance with the schedule set by the schedule setting unit 68. For example, a prescribed time during daytime is set as a suppression period.

Figure 5:
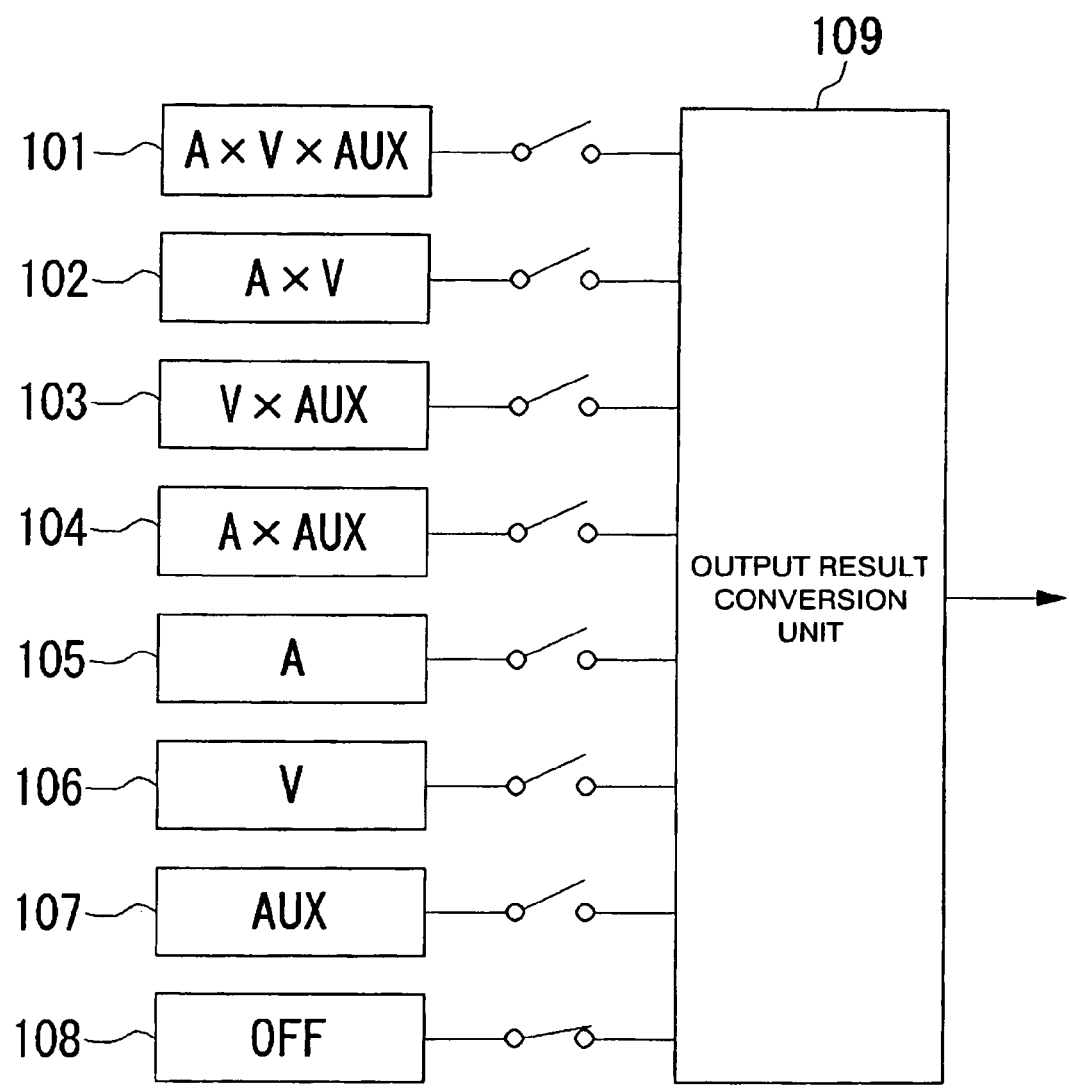
FIG. 5 shows the choice function for a criterion.

FIG. 5 conceptually shows the above-described configuration for choosing a criterion. In FIG. 5, "A" represents a sound anomaly (Audio), "V" represents an image anomaly (Video), and "AUX" represents a sensor anomaly (Auxiliary terminal input). An operator "x" represents logical conjunction.

As shown in FIG. 5, criteria 101 to 108 can be chosen in the embodiment. The criterion 101 is "A×V×AUX". If this criterion is set, it is judged that there is an anomaly when a sound anomaly, an image anomaly, and a sensor anomaly are all detected. The criterion 102 is "A×V". It is judged that there is an anomaly when a sound anomaly and an image anomaly are detected. Likewise, the criterion 103 is "V×AUX". It is judged that there is an anomaly when an image anomaly and a sensor anomaly are detected. Likewise, the criterion 104 is "A×AUX". It is judged that there is an anomaly when a sound anomaly and a sensor anomaly are detected. The criterion 105 is "A". Therefore, it is judged that there is an anomaly when a sound anomaly is detected, regardless of whether or not there is an image anomaly or a sensor anomaly. Likewise, the criterion 106 is "V", and it is judged that there is an anomaly if an image anomaly is detected. The criterion 107 is "AUX", and it is judged that there is an anomaly if a sensor anomaly is detected. Moreover, the criterion 108 is OFF, and the anomaly judgment is not performed. The criterion 108 corresponds to the process of suppressing the anomaly detection function. In the state of FIG. 5, the criterion 108 is chosen, so that the anomaly detection function is suppressed.

An output result conversion unit 109 corresponds to the anomaly notification unit 62 of FIG. 4. The output result conversion unit 109 receives a judgment result of a chosen criterion, and converts the judgment result to anomaly notification information. If the judgment result is that there is an anomaly, data (alarm) indicating an occurrence of an anomaly is generated. The anomaly notification information is outputted to the controller.

The configuration of FIG. 5, along with the other functions of the comprehensive anomaly judgment unit 60, is realized by the microcomputer 46 of FIG. 2. When a criterion is chosen, the controller 14 first accepts a choice operation for a criterion by means of an operation device 72. Control data indicating the criterion is then sent from the controller 14. The microcomputer 46 sets the criterion in accordance with the received control data, and performs a judgment process by the set criterion.

In the next place, a setting function for the sound anomaly judgment level (detection sensitivity) of the embodiment will be described. The sound anomaly judgment level is a threshold for detecting a sound anomaly. If the loudness of an input sound is equal to or greater than the sound anomaly judgment level, a sound anomaly is detected as described above.

Figure 6:
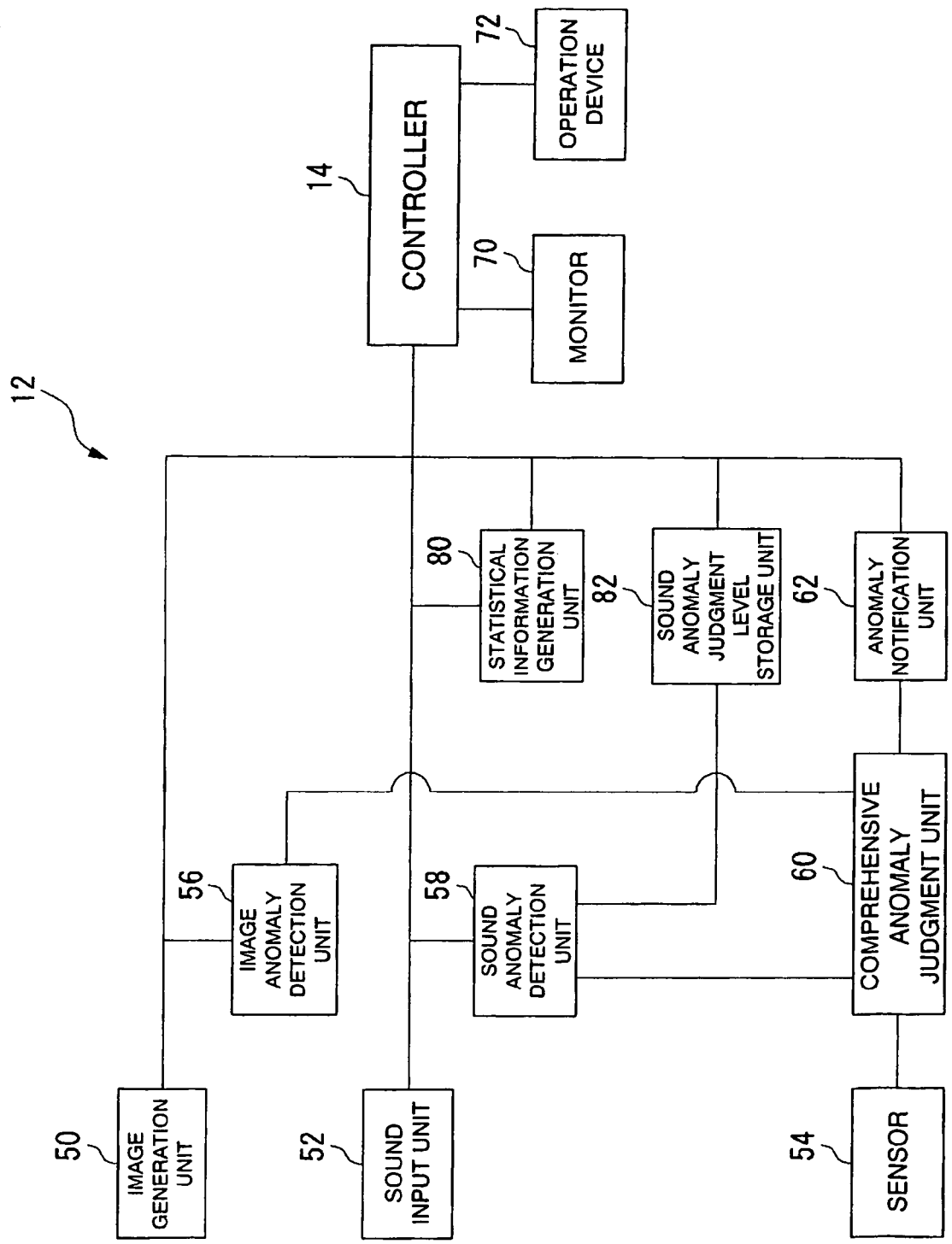
FIG. 6 is a block diagram showing a configuration related to a setting function for a sound anomaly judgment level.

FIG. 6 shows a configuration provided in the monitoring camera device 10 for setting the sound anomaly judgment level. A statistical information generation unit 80 generates statistical information on a sound input state of the sound input unit 52. The statistical information is, for example, a highest level, a lowest level, a moving average, and a frequency distribution. The statistical information is sent to the controller 14 and displayed on the monitor 70. Viewing the monitor 70, an operator operates the operation device 72 to perform an operation of setting the sound anomaly judgment level. This operation is accepted, and then the sound anomaly judgment level is sent as a form of control data to the camera 12 and stored in a sound anomaly judgment level storage unit 82. The sound anomaly detection unit 58 then performs the process of detecting a sound anomaly with reference to the sound anomaly judgment level stored in the sound anomaly judgment level storage unit 82.

The sound anomaly detection unit 58 of FIG. 6 comprises the microcomputer 46 of FIG. 2. The microcomputer 46 stores a set sound anomaly judgment level, and detects a sound anomaly using the stored sound anomaly judgment level.

Figure 7:
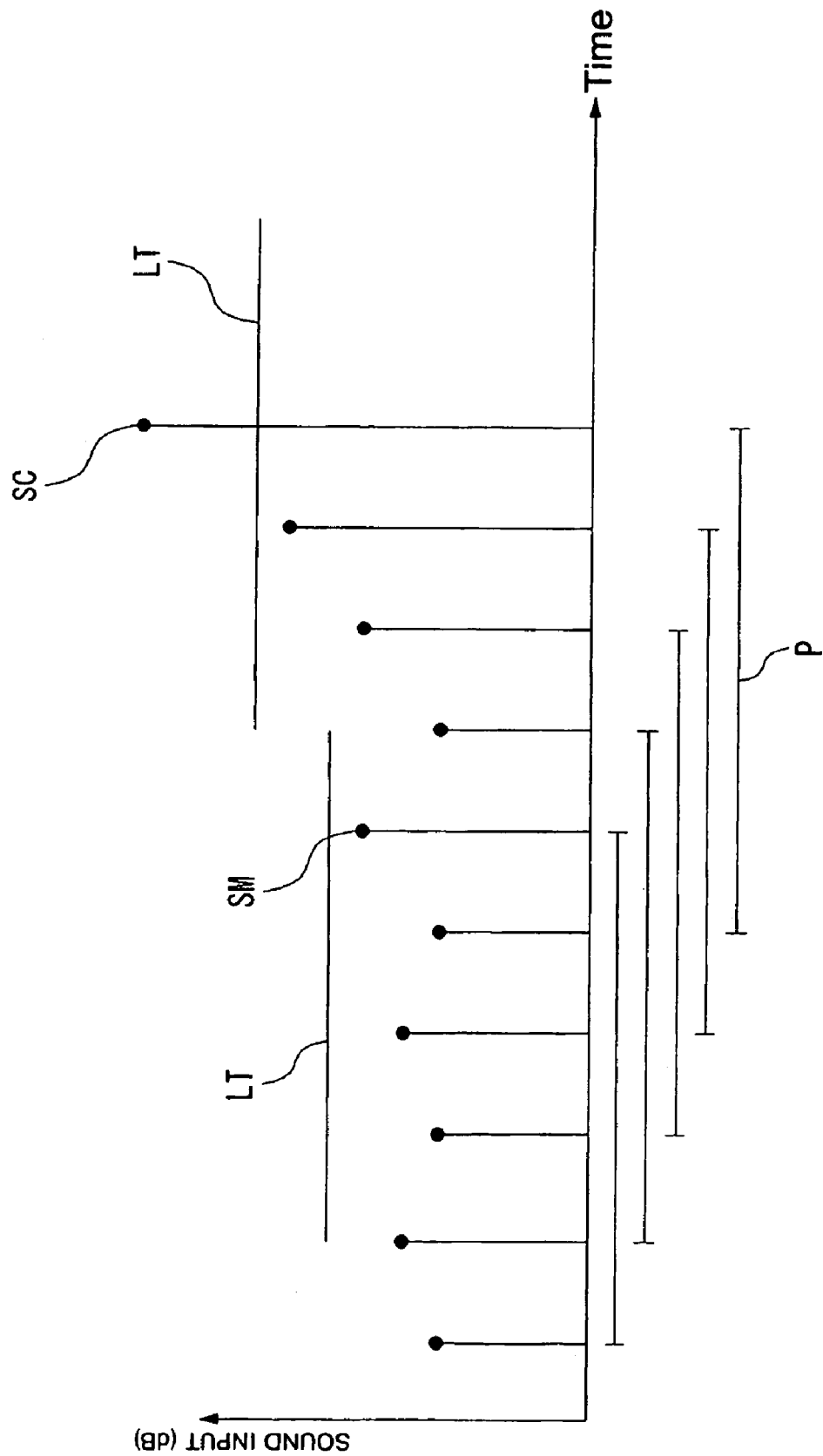
FIG. 7 shows statistical information on a sound input state.

FIG. 7 shows statistical information displayed on the monitor 70. A moving average "SM" is displayed in the example of FIG. 7. The moving average "SM" is an average of sound input data over an appropriate period of time, where the time period for average calculation "P" (computation span of past data for moving average calculation) is shifted sequentially as shown in the lower part of the figure. An operator views the moving average "SM" and adds an appropriate margin to the moving average "SM" to set a sound anomaly judgment level "LT". Providing statistical information can prevent the sound anomaly judgment level "LT" from being affected by unusual data. By using such a sound anomaly judgment level "LT", an impulsive sound or other sudden inputs can be suitably detected. For example, in FIG. 7, when an anomaly occurs, a current input "SC" exceeds the sound anomaly judgment level "LT", so that the anomaly is detected.

Figure 8:
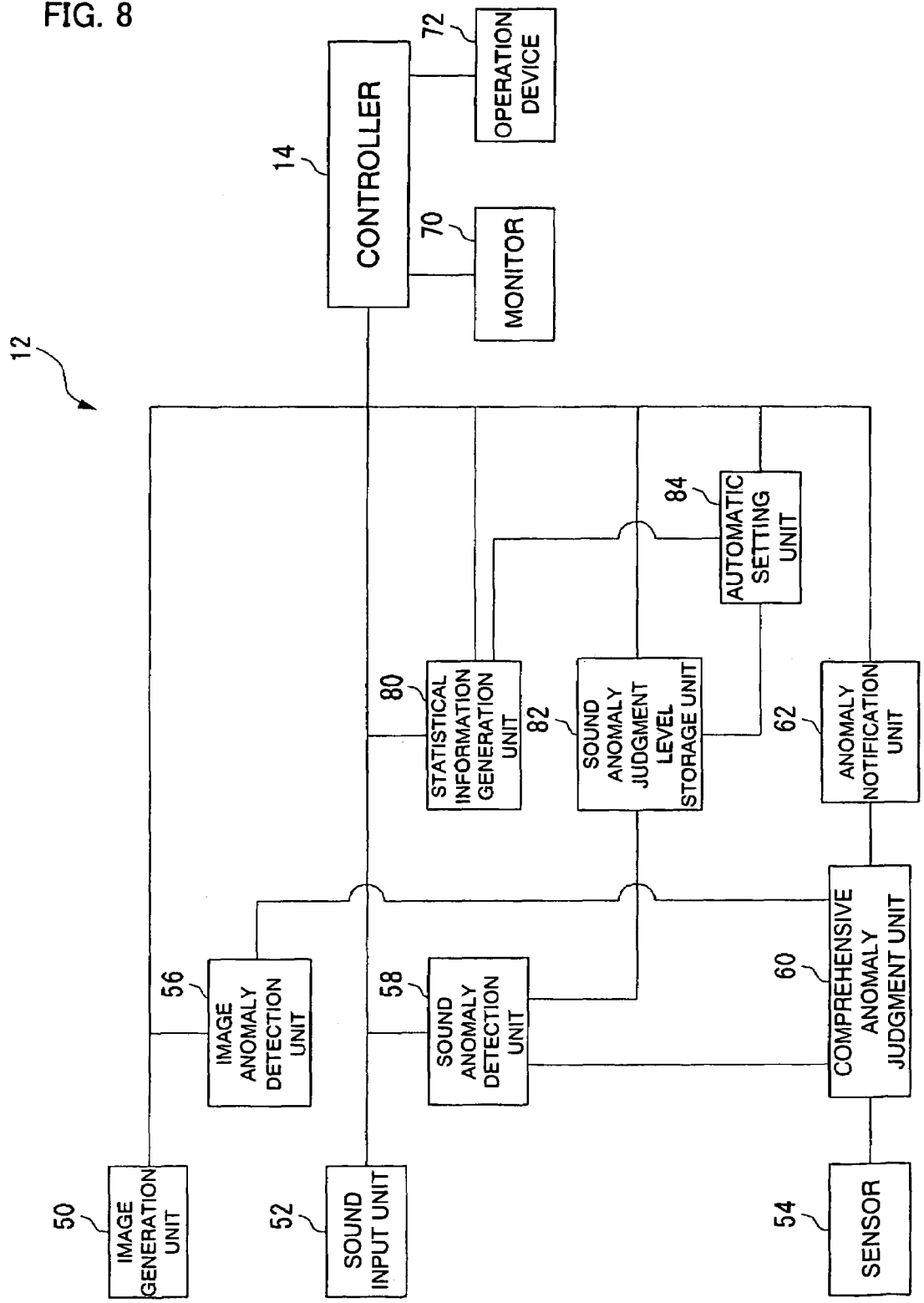
FIG. 8 is a block diagram showing a configuration related to an automatic setting function for the sound anomaly judgment level.

FIG. 8 shows a configuration of a variation of FIG. 6. An automatic setting function for the sound anomaly judgment level is added in FIG. 8. In FIG. 8, an automatic setting unit 84 automatically sets the sound anomaly judgment level with reference to statistical information generated by the statistical information generation unit 80. The above-mentioned moving average, for example, is used for the automatic setting process. The sound anomaly judgment level is automatically calculated by adding a prescribed margin to the moving average. This sound anomaly judgment level is stored in the sound anomaly judgment level storage unit 82 and used for anomaly detection. The automatic setting unit 84 automatically sets the sound anomaly judgment level on a regular basis, and the sound anomaly judgment level is thus regularly renewed. Consequently, the sound anomaly judgment level dynamically changes with time.

In FIG. 8, the monitoring camera device 10 is configured such that a mode in which the sound anomaly judgment level is set automatically or a mode in which it is set manually can be chosen, as described below. An operator performs an operation on the operation device 72 to choose whether the sound anomaly judgment level is set automatically or manually. This operation is accepted by the controller 14. In accordance with the operation, the controller 14 instructs the camera 12 to set automatically, or informs the camera 12 of the sound anomaly judgment level inputted by the operator. In the camera 12, the microcomputer (see FIG. 2) functions as a judgment level setting mode choice unit. Upon receiving an instruction to set automatically, the microcomputer sets the automatic setting mode. When the automatic setting mode is set, the automatic setting unit 84 performs automatic setting as described above. The automatic setting unit 84 also is realized by the microcomputer.

In relation to the above-mentioned automatic setting, a simple learning setting instruction trigger is suitably provided. For example, a trigger occurs when an operator instructs of automatic setting. In response to the trigger, data of an input state of an input sound after the instruction is accumulated; statistical information is generated based on the accumulated data; and the sound anomaly judgment level is set automatically.

Figure 9:
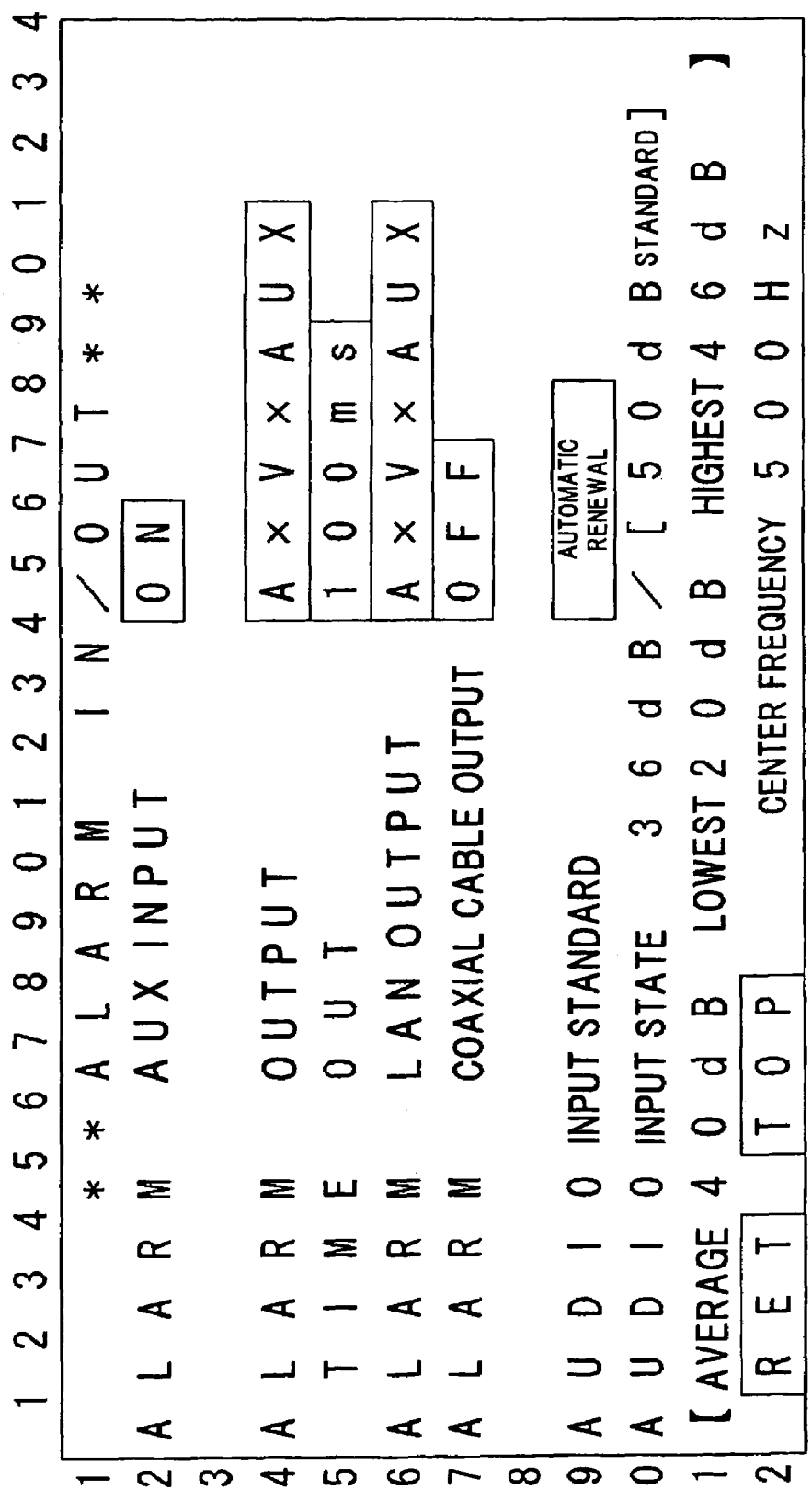
FIG. 9 shows a menu screen.

FIG. 9 shows a menu screen displayed on the monitor 70. In the screen of FIG. 9, AUX INPUT is ON, which means that the external sensor is used on the camera side. ALARM OUTPUT is "A×V×AUX". Accordingly, an alarm is outputted on the camera side when a sound anomaly, an image anomaly, and a sensor anomaly are all detected. TIMEOUT for the alarm output is set to 100 ms. In addition, ALARM LAN OUTPUT also is "A×V×AUX". On the other hand, COAXIAL CABLE OUTPUT is OFF. In this example, the menu screen of FIG. 9 is ready for a case where the camera has its own alarm output function (a lamp and a buzzer, for example) and LAN communication function, in addition to the above-described function to communicate with the controller via the coaxial cable. In the state of FIG. 9, the coaxial cable is OFF (not used), and the alarm's own output function and the LAN output function are used.

Information about a sound input is shown in the lower part of the screen of FIG. 9. In FIG. 9, AUDIO INPUT STANDARD is "AUTOMATIC RENEWAL." So, the mode in which the sound anomaly judgment level is set automatically is chosen and set. The current AUDIO INPUT STATE is 36 dB and the sound anomaly judgment level is 50 dB. Therefore, a sound anomaly is not currently detected.

As for statistical information, AVERAGE is 40 dB, LOWEST is 20 dB, HIGHEST is 46 dB, and CENTER FREQUENCY is 500 Hz. The sound anomaly judgment level of 50 dB is a value where a margin of 10 dB is added to AVERAGE of 40 dB.

A setting function for a sound, input level of the embodiment will be described next. Here again, statistical information on a sound input state is suitably used.

Figure 10:
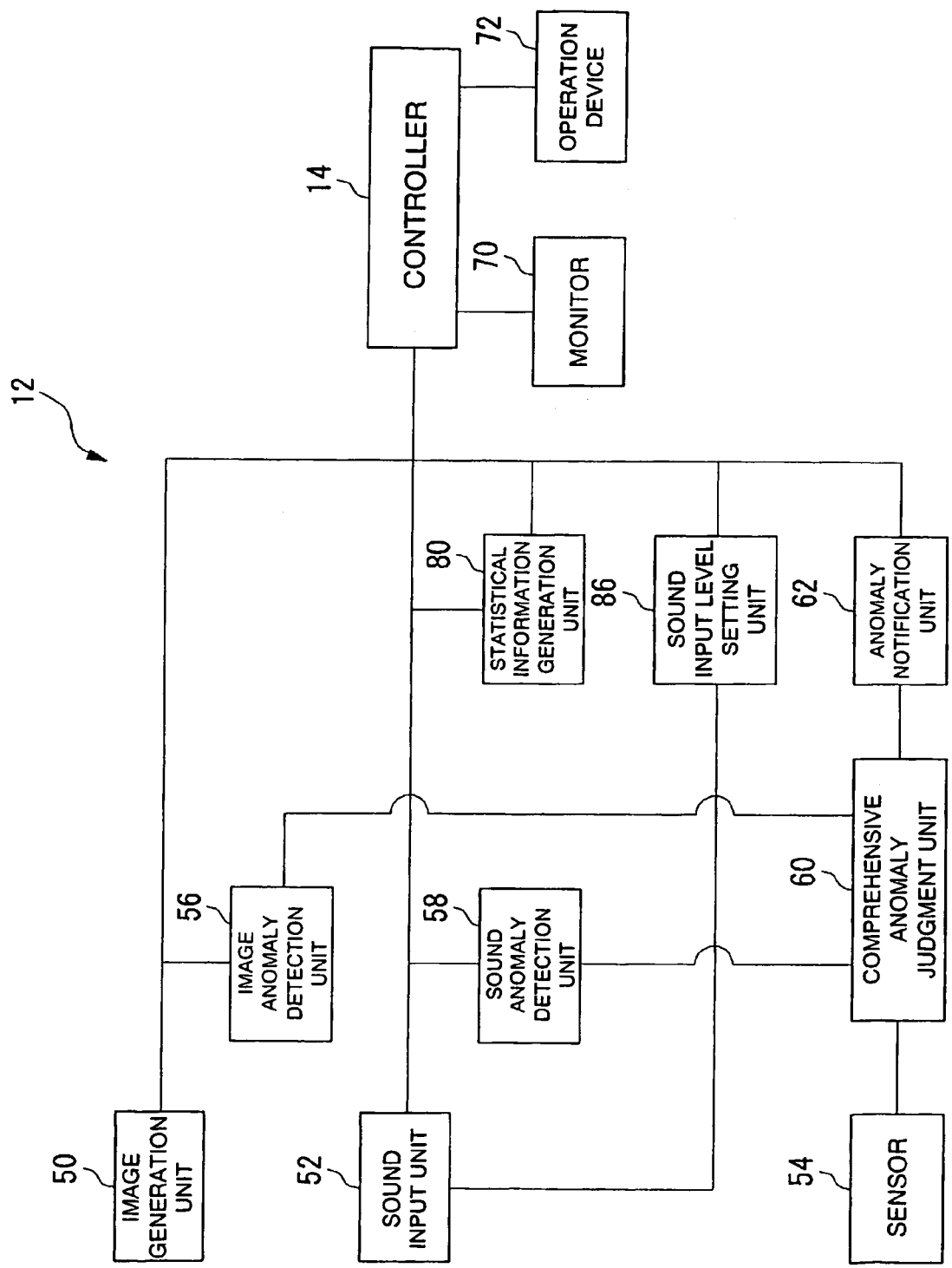
FIG. 10 is a block diagram showing a configuration related to a setting function for a sound input level.

In FIG. 10, a configuration for setting the sound input level is provided. In FIG. 10, the statistical information generation unit 80 generates statistical information on an input state of a sound inputted to the sound input unit 52, as described above. The statistical information is, for example, a highest level, a lowest level, a moving average, and a frequency distribution. The statistical information is sent to the controller 14 and displayed on the monitor 70. Viewing the monitor 70, an operator operates the operation device 72 to perform an operation of setting the sound input level. This operation is accepted, and then the set value of the sound input level is sent as a form of control data to the camera 12 and transmitted to a sound input level setting unit 86. In accordance with an instruction from the controller 14, the sound input level setting unit 86 controls the sound input unit 52 to adjust the sound input level. In the configuration of FIG. 2, the microcomputer 46 functions as the sound input level setting unit 86, and controls the amplifier 34 comprising the sound input unit 52 to adjust the input level.

A setting function for a sound output level of the embodiment will be described next. Here again, statistical information on a sound output state is suitably used.

Figure 11:
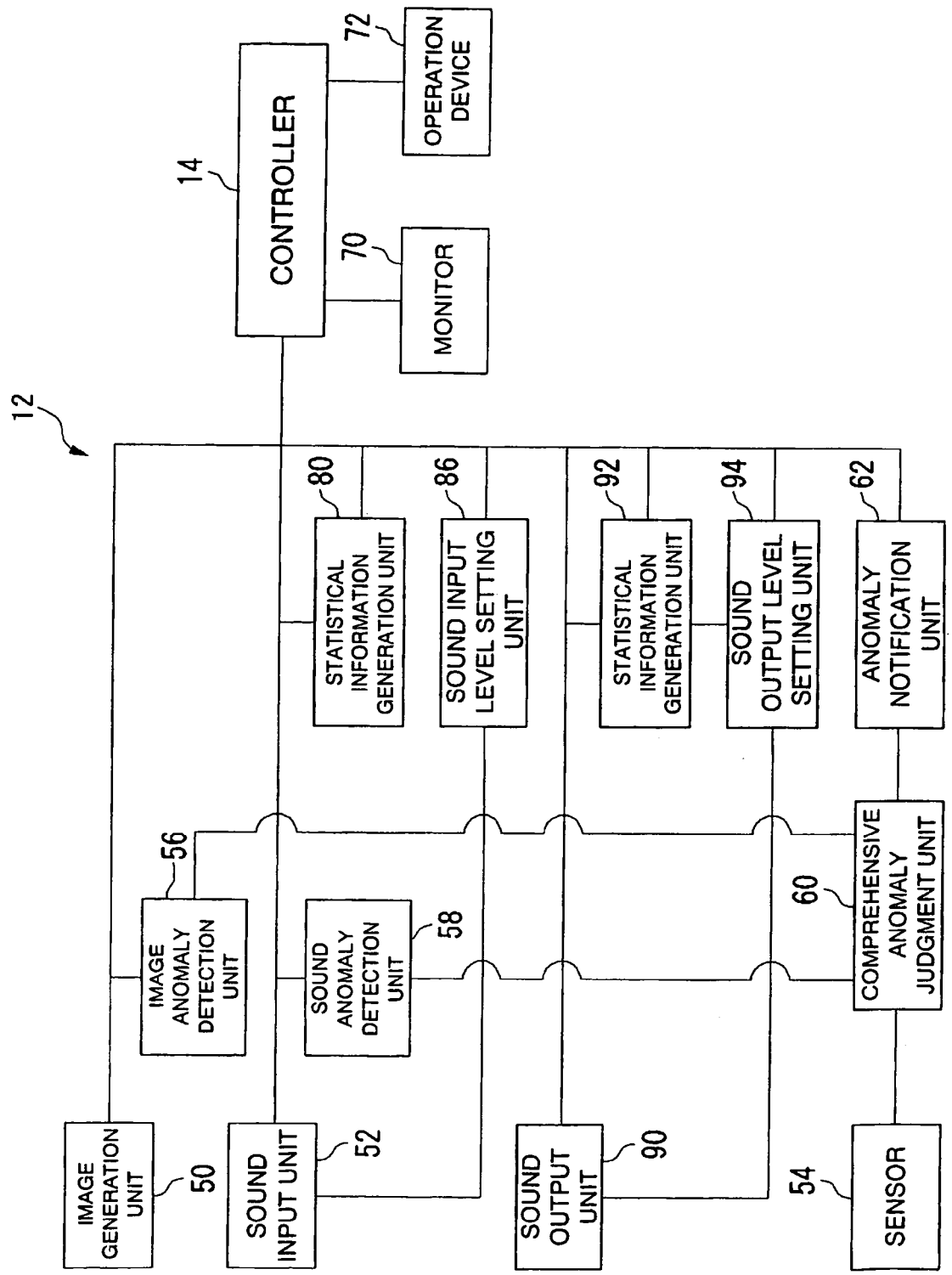
FIG. 11 is a block diagram showing a configuration related to a setting function for a sound output level.

In FIG. 11, a configuration for setting the sound output level is provided. In FIG. 11, a sound output unit 90 comprises the speaker 40 and the amplifier 42 of FIG. 2. Statistical information generation unit 92 generates statistical information on an output state of the sound output unit 90. The statistical information is sent to the controller 14 and displayed on the monitor 70. Viewing the monitor 70, an operator operates the operation device 72 to perform an operation of setting the sound output level. This operation is accepted, and then the set value of the sound output level is sent as a form of control data to the camera 12 and transmitted to a sound output level setting unit 94. In accordance with an instruction from the controller 14, the sound output level setting unit 94 controls the sound output unit 90 to adjust the sound output level. In the configuration of FIG. 2, the microcomputer 46 functions as the sound output level setting unit 94, and controls the amplifier 42 comprising the sound output unit 90 to adjust the output level.

The configurations of FIG. 10 and FIG. 11 may function at the same time. In this case, statistical information on the input level and statistical information on the output level may be displayed on the monitor 70 side by side at the same time.

In the following, a variety of applications, variations, configurations which can be added, and the like of the embodiment will be described.

In the embodiment, the camera and the controller are connected to each other by a coaxial cable. Alternatively, the camera may be provided with a function of a Web server. The controller may comprise a computer provided with a function of a Web browser, or may be a personal computer. An image, a sound, anomaly detection data, and control data are communicated between the camera and the controller through a network. The controller may be connected to the camera via the Internet.

In the above embodiment, the comprehensive anomaly judgment unit 60 is configured so as to perform a judgment according to logical conjunction. Alternatively, the comprehensive anomaly judgment unit 60 may be configured so as to perform a judgment according to logical disjunction. Logical disjunction and logical conjunction may be combined. For example, a judgment process such as "(image anomaly OR sensor anomaly) AND sound anomaly" is performed.

In the above embodiment, there is one external sensor. Alternatively, there may be a plurality of sensors. Whether or not there is an anomaly is comprehensively judged based on detection results of the plurality of sensors, a detection result of an image anomaly, and a detection result of a sound anomaly.

As for the case where anomaly notification is performed on a network, the following various configurations may be used. In a case where promptness and reliable reachability of notification are important, a message to a specific port constantly connected via TCP/IP is suitably used. In a case where simultaneity is not required and geographical reachability is important, notification to a terminal may be performed through a mail server. In a case where accumulation is important as notification to a server, FTP transmission is suitably performed. In a case where history and searchability are important, logging is suitably performed. As for notification, an image may be attached for accumulation of alarm images or the like. With consideration given to this, and depending on usage and purpose, an appropriate notification method may be adopted.

In the embodiment, the input level may be adjusted to be replaced with a level of a sound of a constant frequency. This allows information on the input level to be converted so that a sound during operation does not correspond to interception. By the above conversion, a sound becomes inaudible to human beings. As a result, sound information to be sent to the controller becomes unable to be used for interception. Sound information is suitably used for setting the anomaly judgment level. Alternatively, at the time of sound adjustment, an input sound may be changed to an intermittent sound. A setting may be made in which an actual sound is transmitted only when there is a certain sound.

In the embodiment, when the sound output and input levels are adjusted, output and input states are displayed in an image on the controller-side monitor as described above. In this regard, the output and input levels need not be set by opening a menu or the like on the controller side. Information on output and input states may be superimposed on a camera image and transmitted, only at the time of setting the output and input levels, upon request of the controller. This allows a subject image to avoid being hidden. Moreover, data of output and input states need not be an image itself. Text character data to be directly displayed may be transmitted with an image. An arbitrary data area of a header for JPEG compression may be used for transmission of data of output and input states. A header for MPEG may be used similarly. In this case, for example, data is extracted and displayed on the controller side which receives the data. Data may be constantly displayed in a small display area of a Web browser. So as to realize this, a programming language or other scripts may be used, a Web server may be provided on the camera side, or the operation may be described in HTML and embedded.

In the embodiment, when information on output and input states is displayed on the controller-side monitor, these pieces of information are suitably put in an image taken by the camera. A character may be used in this case (dB value, for example). A graphic indicating a level or relative value may also be displayed. A combination of a character and a graphic may be displayed. For example, numbers representing output and input numerical values may be displayed, or a graphic representing a cumulative value may be displayed. A tachometer-like design may be used for display. As for images, an area and intensity may be indicated by a color or luminance as to motion detection in an image. Image display may be different between the time of operation (alarm detection) and the time of the setting (sensitivity setting). An appropriate image may be combined with a choice of various operations and transmitted, as appropriate. For example, at the time of the setting, a detection result based on the above-described detection level is combined and displayed, but alarm output is suppressed. The alarm is effective only during actual operation after the setting. A detection result need not be displayed during operation. An image signal or data is used effectively. Even if no other data is exchanged, information is suitably obtained, and an adjustment of the equipment can be made.

In the above embodiment, when the sound input level of the camera is adjusted, information on the input level is transmitted to the controller and displayed on the monitor. This allows the adjustment work to be performed at a place apart from the camera. Alternatively, a worker may adjust the input level at an installation location of the camera. In this case, the camera is connected with a monitor, and the input level is displayed on the monitor. An operator operates an input level adjustment switch incorporated in the camera. Viewing an image on the monitor, an operator can grasp the input level and perform level adjustment. In the level adjustment, an operation may be performed using a menu superimposed on an output image screen of the monitor. Also in such a configuration, the input level adjustment can be suitably performed even K a sound inputted to the camera is not outputted from the speaker, that is, even if the actual input sound is not perceived by ear. As for the output level adjustment also, adjustment may be performed using a monitor at an installation location of the camera, as with the above. The same holds for the sound anomaly judgment level.

The following configuration may be adopted for the sound input part on the camera side. A circuit is arranged for performing impedance matching, impedance conversion, and amplification for an output circuit of a sound pressure sensor. A/D conversion of a discrete sample of sound is performed on a specific voice band of 16 kHz, for example, at a sampling frequency of 32 kHz with consideration of a Nyquist-frequency, or at a frequency of an oversampling technique. An analog low-pass filter having a cutoff frequency with this in view is added to a downstream circuit of the input stage. A signal is inputted to an A/D conversion circuit and sampled. Downsampling may be performed after the sampling. An operation of convolution or FFT, or other process may be performed for conversion to a power index for each frequency or for the whole band.

Up to this point, the monitoring camera device 10 according to the embodiment of the invention has been described. In the embodiment, the process of comprehensively judging whether or not there is an anomaly based on a sound anomaly and an image anomaly is performed, and therefore an anomaly can be reliably detected.

As described with reference to FIGS. 4 and 5, the embodiment can appropriately change, depending on the situation, between the criterion by which it is judged that there is an anomaly when both of a sound anomaly and an image anomaly are detected, and the criterion by which it is judged that there is an anomaly when any of a sound anomaly and an image anomaly is detected.

In the embodiment, the process of comprehensively judging whether or not there is an anomaly is performed based on a sensor anomaly detected by the sensor in addition to a sound anomaly and an image anomaly, and therefore an anomaly can be reliably detected.

As described with reference to FIGS. 4 and 5, the embodiment can change, as required, which of a sound anomaly, an image anomaly, or a sensor anomaly is to be detected to judge that there is an anomaly.

Since the embodiment is provided with the function of suppressing anomaly detection in accordance with a schedule setting, anomaly notification can be avoided when anomaly detection is not required. In order to suppress anomaly detection, anomaly detection may be suppressed, the above-mentioned comprehensive judgment may be suppressed, or the anomaly notification (output) may be suppressed.

In the embodiment, statistical information on a sound input state of the camera side is generated, transmitted, and displayed on the monitor, and an operation of setting the sound anomaly judgment level is performed on the monitor side. Conventionally, an operator would adjust the sound anomaly judgment level by listening to an actual sound. In the embodiment, on the other hand, an ambient background sound can be grasped and the sound anomaly judgment level can be set, even without checking an actual sound. Consequently, even when it takes time to transmit a sound, or even if a sound is not transmitted, the operation of setting the sound anomaly judgment level can be performed by viewing the statistical information. The sound anomaly judgment level can be suitably set even when the control equipment is remote. In addition, for example, the sound anomaly judgment level can be set even when a sound cannot be transmitted from a legal or other point of view. Moreover, the display of the statistical information can provide useful information for appropriately setting the sound anomaly judgment level. As previously described, the statistical information is, for example, a highest volume, a lowest volume, a moving average, a frequency distribution, and the like.

In the embodiment, the sound anomaly judgment level can be set automatically and appropriately by being based on statistical information on a sound input state. Additionally, the setting of the sound anomaly judgment level can be changed between the automatic setting and the manual setting based on displayed statistical information.

In the embodiment, statistical information on a sound input state of the camera side is generated, transmitted, and displayed on the monitor, and an operation of setting the sound input level is performed on the monitor side. Conventionally, an operator would adjust the sound input level by listening to an actual sound. In the embodiment, on the other hand, an ambient background sound can be grasped and the sound input level can be set, even without checking an actual sound. Consequently, even when it takes time to transmit a sound, or even if a sound is not transmitted, the operation of setting the sound input level can be suitably performed by viewing the statistical information. The input level can be suitably set even when the control equipment is remote. In addition, for example, the sound input level can be set even when a sound cannot be transmitted from a legal or other point of view.

In the embodiment, statistical information on a sound output state of the camera side is generated, transmitted, and displayed on the monitor, and an operation of setting the sound output level is performed on the monitor side. Consequently, even when it takes time to transmit a sound, or even if a sound is not transmitted, the operation of setting the sound output level can be performed by viewing the statistical information. The output level can be suitably set even when the control equipment is remote.

While there has been described what are at present considered to be preferred embodiments of the invention, it will be understood that various modifications and variations may be made thereto, and it is intended that appended claims cover all such modifications and variations as fall within the true spirit and scope of the invention.

INDUSTRIAL APPLICABILITY

As stated above, the monitoring camera device consistent with the invention has the advantage that an anomaly can be reliably detected and notified. The invention is useful as a monitoring camera device or the like.

What is claimed is:

1. A monitoring camera device, comprising: a camera; a monitor connected to said camera; and an operation unit, wherein
   said camera includes: a sound input unit which inputs a monitoring sound obtained from a monitoring place but does not transmit said monitoring sound; a sound anomaly detection unit which detects a sound anomaly in said monitoring place; and a statistical information generation unit which generates statistical information over time on an input state of said sound input unit and transmits said statistical information to said monitor,
   said monitor displays said statistical information which is transmitted from said camera, and
   said operation unit accepts an operation for setting a sound anomaly judgment level for said sound anomaly detection unit.

2. The monitoring camera device according to claim 1, comprising:
   an automatic setting unit for automatically adjusting said sound anomaly judgment level based on said statistical information; and
   a sound anomaly judgment level setting mode choice unit for choosing a mode in which said automatic setting unit is made to set said sound anomaly judgment level, or a mode in which said sound anomaly judgment level is set in accordance with an operation accepted by said operation unit.

3. A method of setting a sound anomaly judgment level for sound anomaly detection by a camera, said method being performed on a monitoring camera device, said monitoring camera device comprising: a camera for taking a picture of a monitoring place; a monitor connected to said camera; and an operation unit, said camera being provided with a function to input a monitoring sound of said monitoring place and to detect a sound anomaly in said monitoring sound, said method comprising:
   inputting said monitoring sound of said monitoring place to said camera;
   generating statistical information over time on an input state of a sound;
   displaying said statistical information on said monitor;
   accepting by said operation unit an operation of setting a sound anomaly judgment level for sound anomaly detection, after said statistical information is displayed; and
   setting a sound anomaly judgment level in accordance with an accepted operation.

* * * * *

UNITED STATES PATENT AND TRADEMARK OFFICE
CERTIFICATE OF CORRECTION

PATENT NO.         : 8,330,813 B2
APPLICATION NO.    : 11/573459
DATED              : December 11, 2012
INVENTOR(S)        : Haruo Kogane et al.

It is certified that error appears in the above-identified patent and that said Letters Patent is hereby corrected as shown below:

In column 14, line 36, please delete "K" and instead insert --if--

Signed and Sealed this
Twelfth Day of March, 2013

Teresa Stanek Rea
*Acting Director of the United States Patent and Trademark Office*